(12) United States Patent
Yamamoto et al.

(10) Patent No.: US 10,871,183 B2
(45) Date of Patent: Dec. 22, 2020

(54) METHOD FOR MANUFACTURING FLOATING JOINT, AND FLOATING JOINT MANUFACTURED BY SAID METHOD

(71) Applicant: SMC CORPORATION, Chiyoda-ku (JP)

(72) Inventors: Hitoshi Yamamoto, Shimotsuma (JP); Akira Kuribayashi, Meguro-ku (JP)

(73) Assignee: SMC CORPORATION, Chiyoda-ku (JP)

( * ) Notice: Subject to any disclaimer, the term of this patent is extended or adjusted under 35 U.S.C. 154(b) by 741 days.

(21) Appl. No.: 15/545,507

(22) PCT Filed: Jan. 28, 2015

(86) PCT No.: PCT/JP2015/052262
§ 371 (c)(1),
(2) Date: Jul. 21, 2017

(87) PCT Pub. No.: WO2016/121018
PCT Pub. Date: Aug. 4, 2016

(65) Prior Publication Data
US 2018/0017099 A1 Jan. 18, 2018

(51) Int. Cl.
*F16C 11/06* (2006.01)
(52) U.S. Cl.
CPC .......... *F16C 11/06* (2013.01); *F16C 11/0661* (2013.01); *F16C 11/0685* (2013.01); *F16C 11/0695* (2013.01)
(58) Field of Classification Search
CPC .... F16C 11/06; F16C 11/0685; F16C 11/0695
(Continued)

(56) References Cited

U.S. PATENT DOCUMENTS 1,597,889 A * 8/1926 Hulbert .................. B31B 50/00
493/109
2,772,472 A * 12/1956 Ballou, Jr. ............... A44B 9/20
29/896.42
(Continued)

FOREIGN PATENT DOCUMENTS

CN 104114882 A 10/2014
JP 2000-320533 A 11/2000
(Continued)

OTHER PUBLICATIONS

Indian Office Action and Search Report dated Aug. 30, 2019, in Patent Application No. 201747026547, 5 pages.
(Continued)

*Primary Examiner* — Christopher M Koehler
(74) *Attorney, Agent, or Firm* — Oblon, McClelland, Maier & Neustadt, L.L.P.

(57) ABSTRACT

A floating joint has a first connection section and a second connection section, which are capable of pivoting relative to each other. In the manufacturing of this joint, a receiving step is performed, in which the flange section of the first connection section, the umbrella section of the second connection section, a ring, and a plate are received within a case. Further, the following steps are performed: a staking step in which an end of the case is staked inward to cover the plate; and a gap adjustment step in which the plate is pressed toward the ring to adjust the gap between the ring and the plate.

8 Claims, 11 Drawing Sheets

(58) Field of Classification Search
USPC .................. 29/509, 511, 512, 437, 441.1
See application file for complete search history.

(56) References Cited

U.S. PATENT DOCUMENTS

| | | | | |
|---|---|---|---|---|
| 3,147,537 A * | 9/1964 | Fadow | ................ | F16C 11/0633 |
| | | | | 29/898.044 |
| 3,374,014 A * | 3/1968 | Kull | ................ | F16J 15/00 |
| | | | | 403/332 |
| 3,662,462 A * | 5/1972 | Shiflet | ................ | B21K 25/00 |
| | | | | 29/898.045 |
| 3,699,637 A * | 10/1972 | Rosiek | ................ | B23P 19/062 |
| | | | | 29/432.1 |
| 4,087,897 A * | 5/1978 | Scholefield | ................ | B21D 39/04 |
| | | | | 29/509 |
| 4,095,327 A * | 6/1978 | Hartmann | ................ | B23P 19/062 |
| | | | | 29/509 |
| 4,380,116 A * | 4/1983 | Gossler | ................ | H05B 3/748 |
| | | | | 29/611 |
| 4,450,618 A * | 5/1984 | Ridenour | ................ | B21D 39/04 |
| | | | | 29/509 |
| 4,747,203 A * | 5/1988 | Yukita | ................ | B21K 25/00 |
| | | | | 29/439 |
| 5,136,772 A * | 8/1992 | Rupprecht | ................ | B23P 11/005 |
| | | | | 29/509 |
| 5,415,443 A * | 5/1995 | Hayashi | ................ | B21D 39/06 |
| | | | | 285/222 |
| 5,542,176 A * | 8/1996 | Serizawa | ................ | B21C 37/225 |
| | | | | 165/185 |
| 5,743,571 A * | 4/1998 | Gaitros | ................ | F16L 13/141 |
| | | | | 285/382 |
| 7,364,208 B2 * | 4/2008 | Ichimura | ................ | F16L 41/082 |
| | | | | 285/203 |
| 7,644,500 B2 * | 1/2010 | Schmidt | ................ | B23P 11/005 |
| | | | | 29/441.1 |
| 9,291,195 B1 * | 3/2016 | Parker | ................ | F16C 11/0628 |
| 2015/0001824 A1 | 1/2015 | Kuroda | | |
| 2015/0251512 A1 * | 9/2015 | Karpman | ................ | F16C 11/0614 |
| | | | | 403/122 |
| 2017/0130767 A1 * | 5/2017 | Parker, Jr. | ................ | F16C 11/069 |
| 2017/0268564 A1 * | 9/2017 | Kopsie | ................ | F16C 11/0685 |

FOREIGN PATENT DOCUMENTS

| | | |
|---|---|---|
| JP | 3556338 B2 | 8/2004 |
| JP | 2009-185844 A | 8/2009 |

OTHER PUBLICATIONS

International Search Report dated Apr. 28, 2015 in PCT/JP2015/052262 filed Jan. 28, 2015.
Combined Office Action and Search Report dated Dec. 29, 2018 in Chinese Patent Application No. 201580074615.1, 16 pages (with English translation).

* cited by examiner

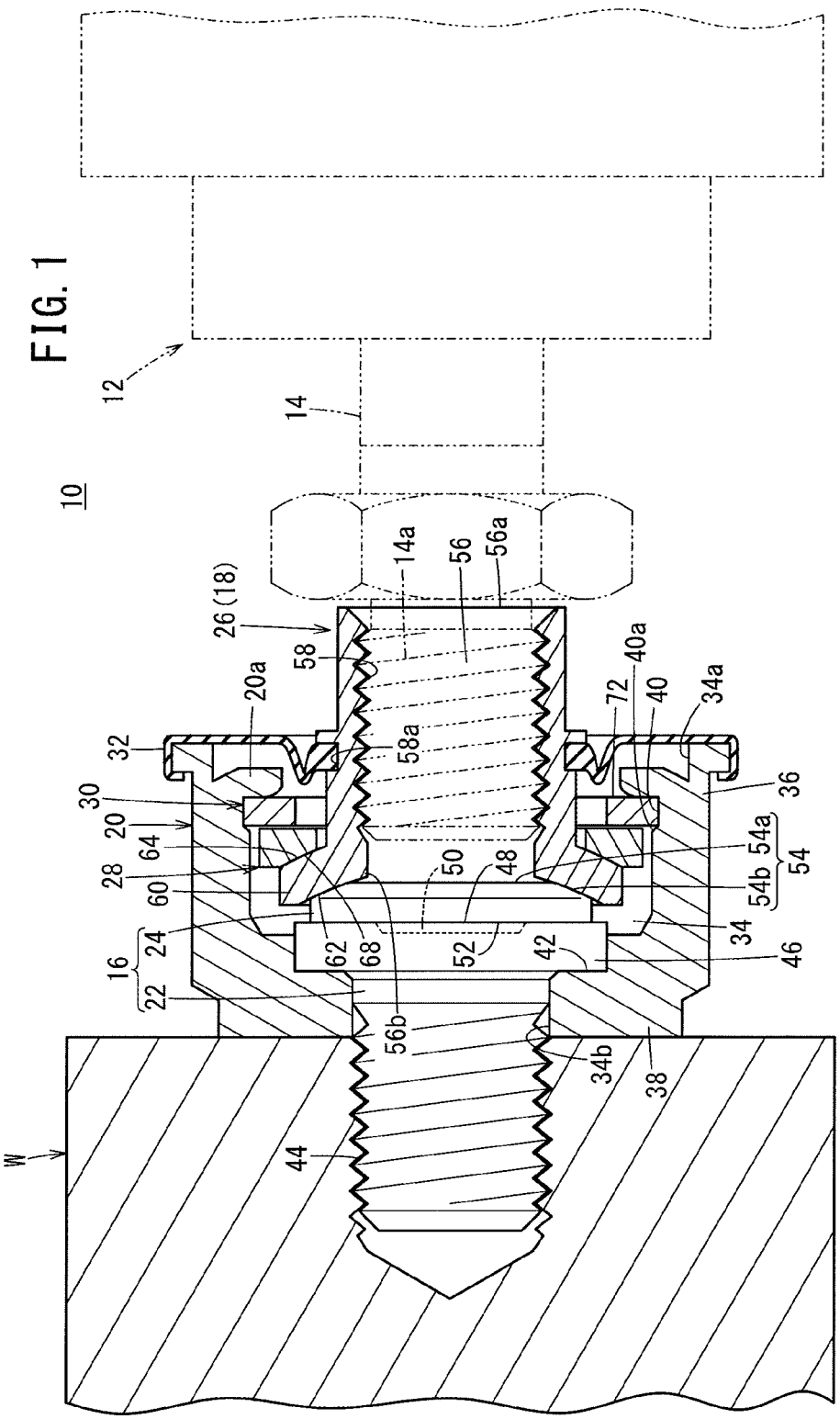

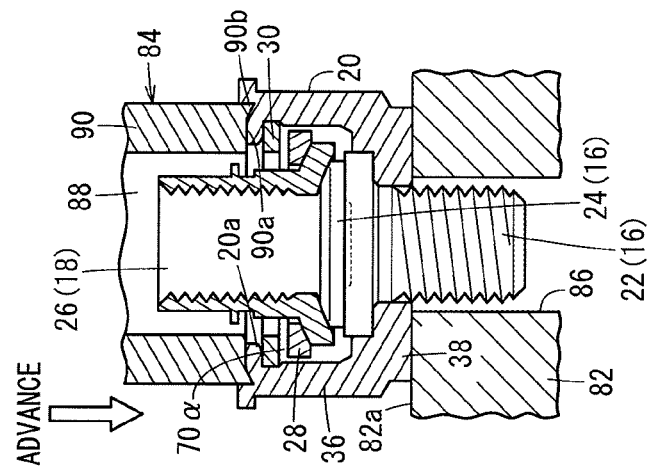
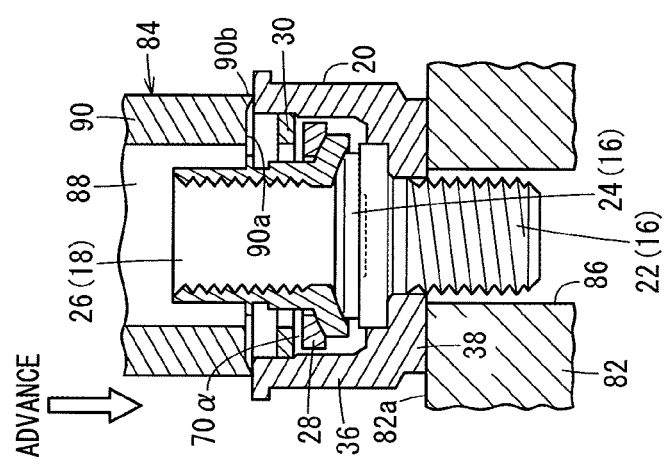
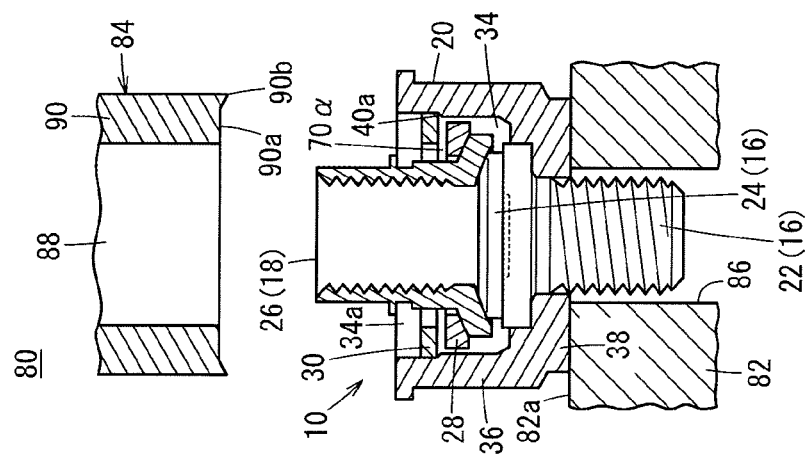

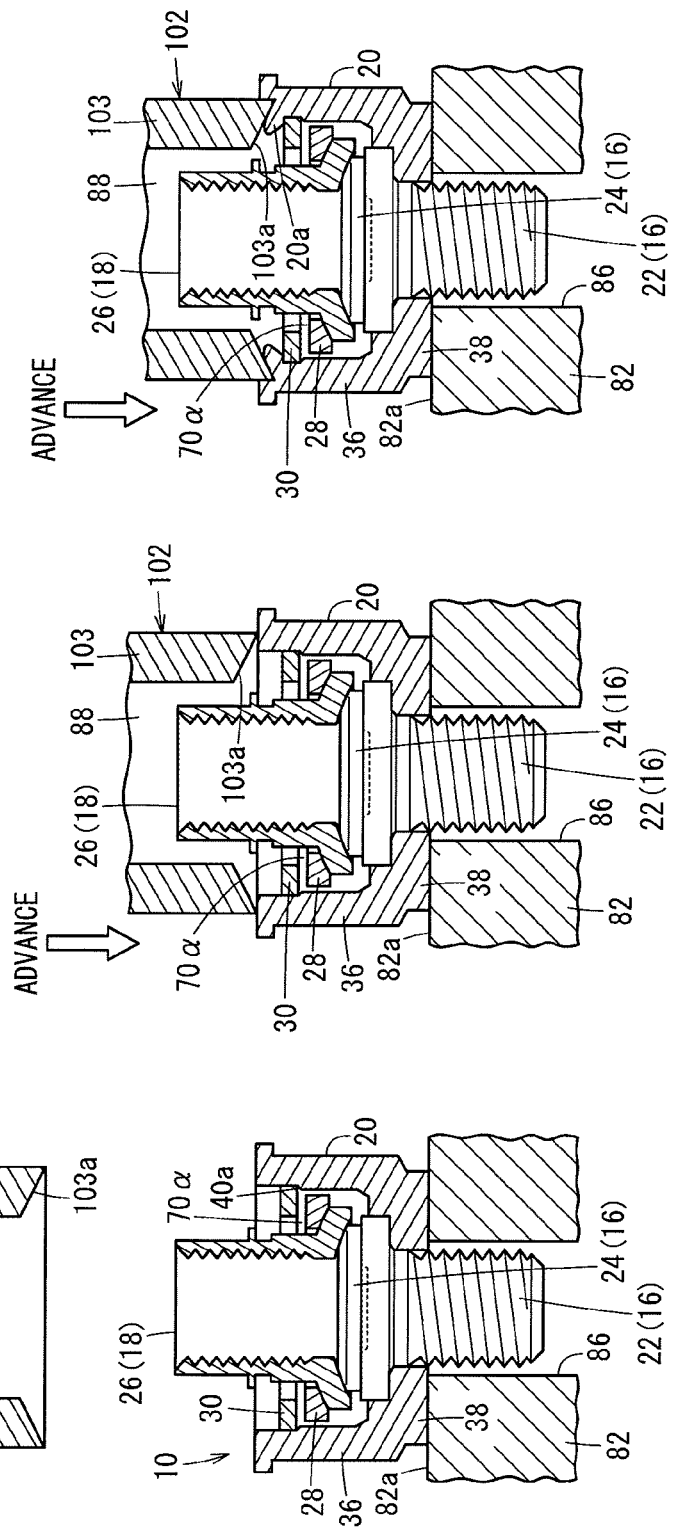

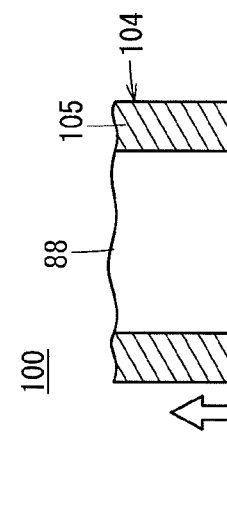
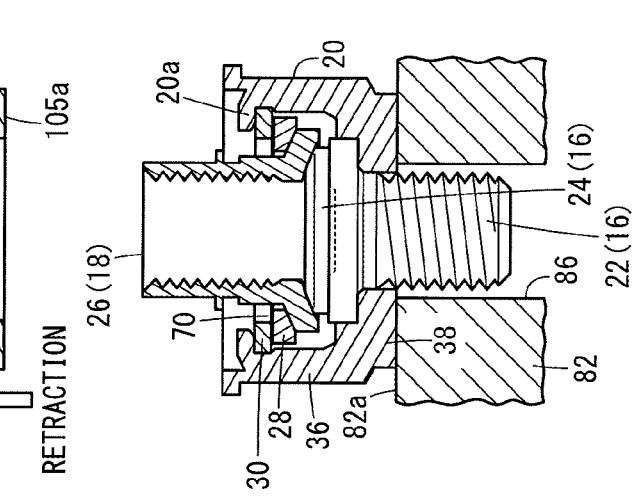
FIG. 9A
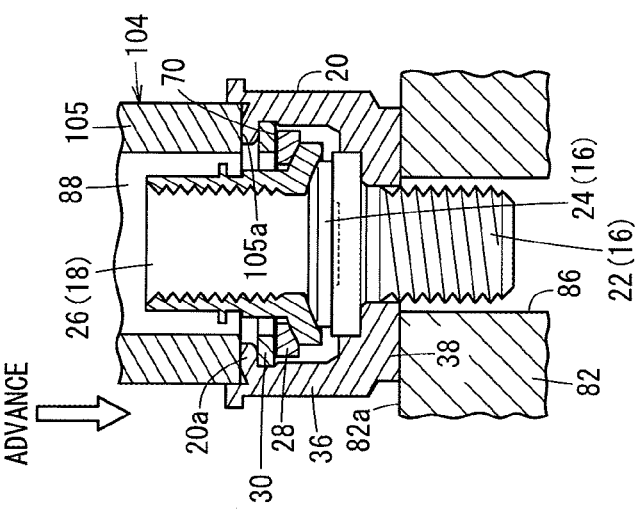
FIG. 9B
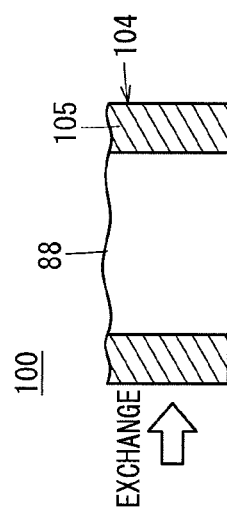
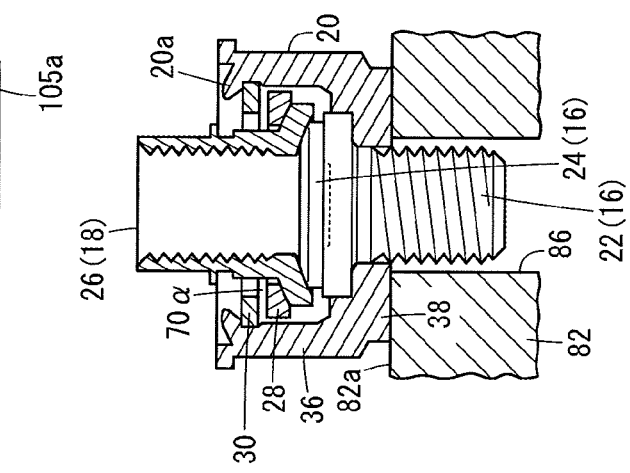
FIG. 9C

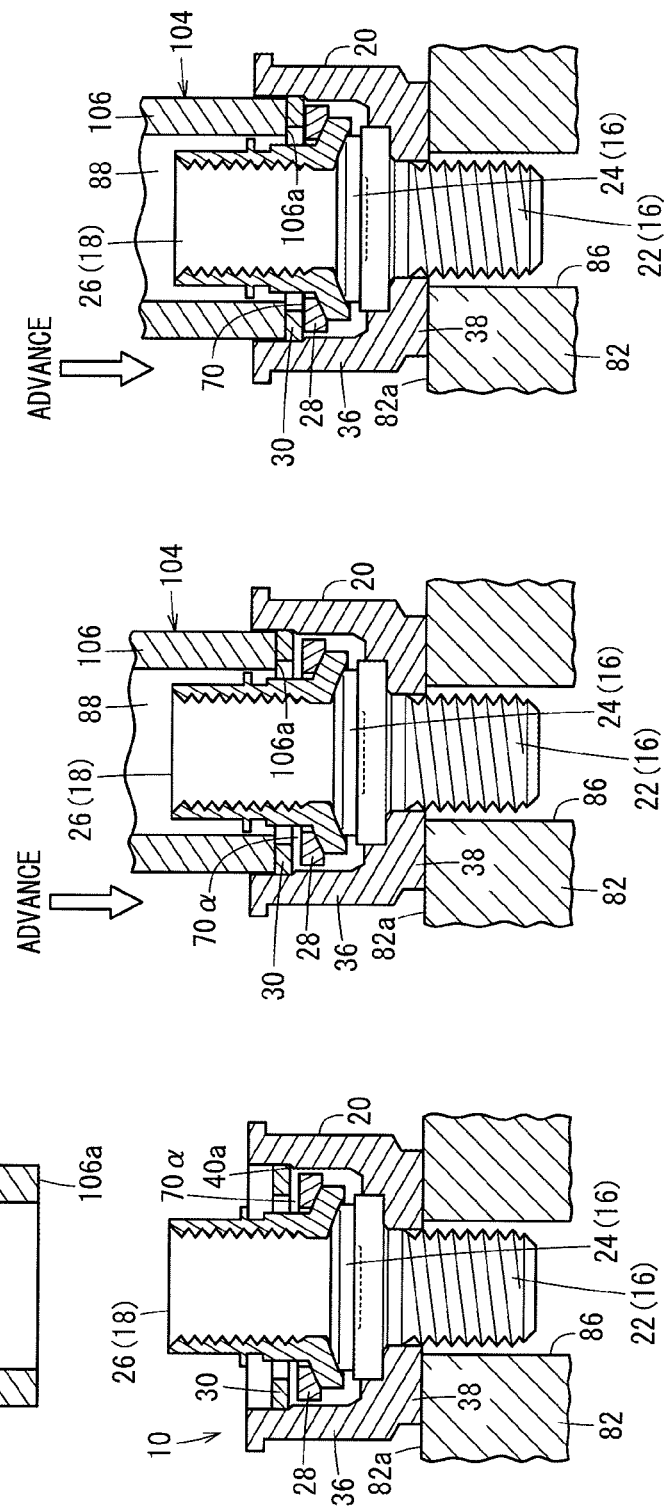
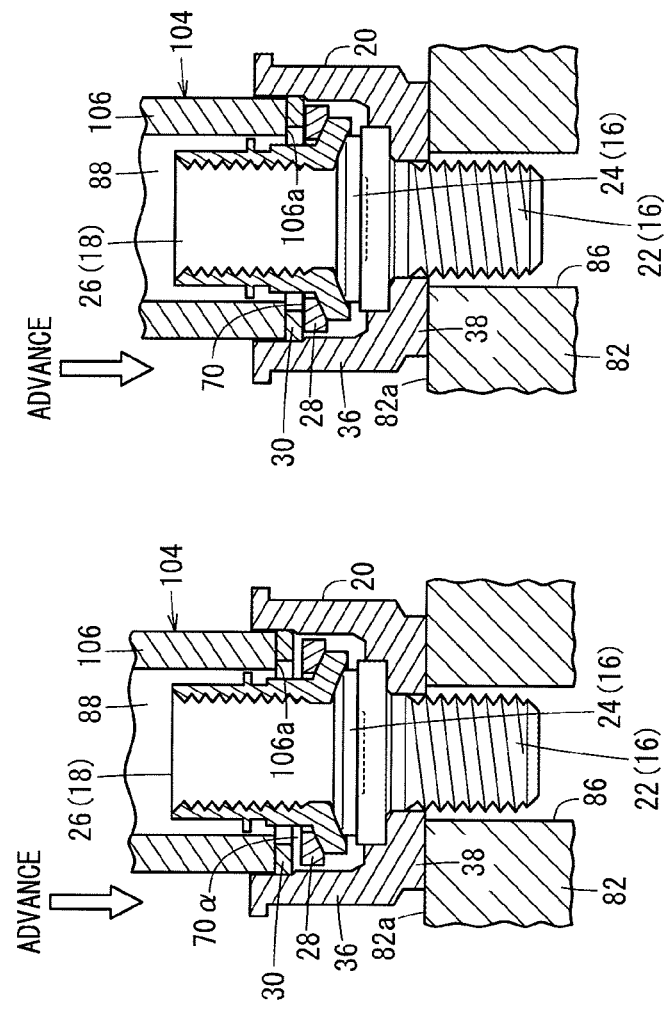
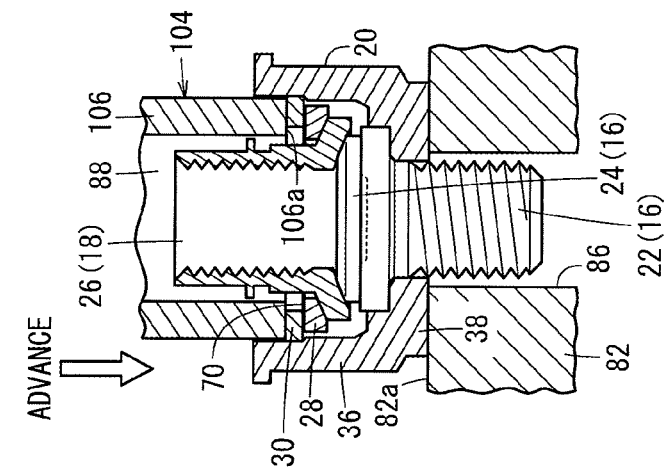

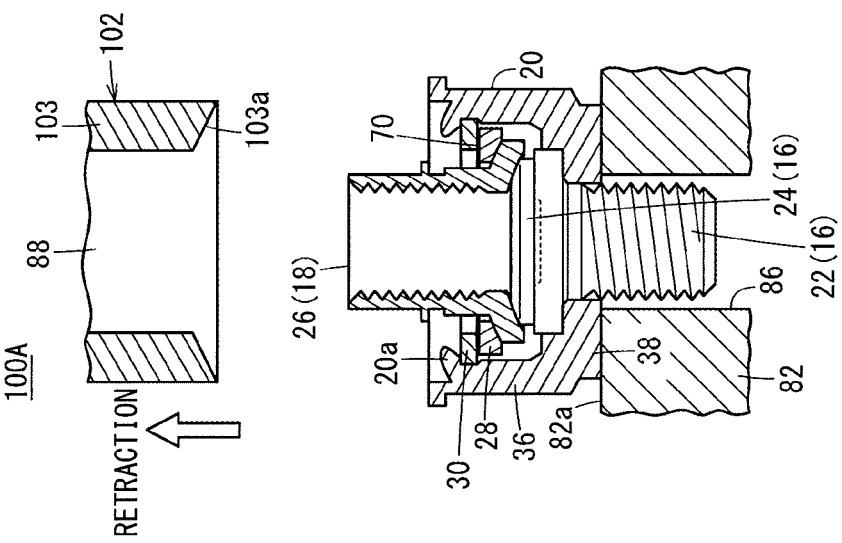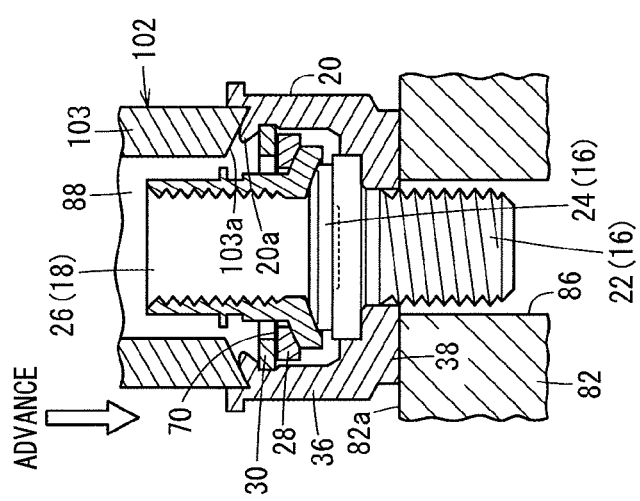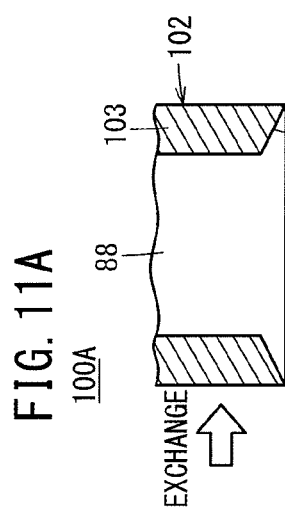

METHOD FOR MANUFACTURING FLOATING JOINT, AND FLOATING JOINT MANUFACTURED BY SAID METHOD

TECHNICAL FIELD

The present invention relates to a method of manufacturing a floating joint that is applied between an actuator and a driven body to absorb mutual misalignment, and a floating joint manufactured by the method.

BACKGROUND ART

A floating joint is a structure that connects a drive shaft of an actuator and a workpiece (driven body). The floating joint transmits the driving force of the actuator to the workpiece while absorbing the misalignment of the axis of the drive shaft and the workpiece or the insufficient precision of the parallelism.

For example, in the floating joint disclosed in Japanese Patent No. 3556338, a flange of a stud part is housed in a joint case made of an elastic material, and a male screw part of a stud part protrudes from a tip of a joint case. Inside the joint case, an internal structure (a socket part, a push screw member, etc.) that allows the stud part to tilt is incorporated. When misalignment occurs between the cylinder rod and the workpiece, the joint case is deflected while the stud part is inclined appropriately, thereby absorbing this misalignment.

SUMMARY OF INVENTION

Meanwhile, in this type of floating joint, usually a slight gap is required between a plurality of members in the joint case constituting the internal structure or between the stud portions in order to tilt the stud portion smoothly. On the other hand, the floating joint is required to have a structure that presses a plurality of members inside the joint case without rattling and securely prevents members from coming off.

The present invention has been made in view of the above circumstances, and it is an object of the present invention to provide a method of manufacturing a floating joint which can efficiently assemble a plurality of members so as to have a predetermined clearance, and can prevent falling off, and a floating joint manufactured by the method.

To achieve the above object, the present invention is a method of manufacturing a floating joint in which a first connecting portion provided at one end of a case and a second connecting portion provided at another end of the case are swingable relatively to each other, the method comprising a housing step of housing in the case a first connecting portion side protrusion protruding radially outward at an end portion of the first connecting portion, a second connecting portion side protrusion protruding radially outward at an end portion of the second connecting portion, a holding member disposed on one surface of the second connecting portion side protrusion and configured to hold the second connecting portion swingably, and a stopper member disposed at a predetermined temporarily stopped position set on an opposite side of the holding member with respect to the second connecting portion side protrusion; a caulking step of caulking an end portion of the case inward to cover the stopper member; and a gap adjusting step of adjusting a gap between the holding member and the stopper member by pressing the stopper member from the temporarily stopped position toward the holding member.

According to the above, at the time of manufacturing the floating joint, after the housing step, the caulking step and the gap adjusting step are performed to reliably caulk the stopper member and precisely adjust the gap between the holding member and the stopper member. That is, in the caulking step, by caulking the end portion of the case inward to cover the stopper member, the disengagement of the stopper member is favorably prevented, and it is possible to prevent falling off of each member housed on the back side of the case from the stopper member. In addition, in the gap adjusting step, by pressing the stopper member to adjust the gap between the stopper member and the holding member, strong pressing of the respective members is suppressed, and the first and second connecting portions can be swung smoothly.

In the caulking step and the gap adjusting step, it is preferable to use the same caulking tool.

In this manner, by using the same caulking tool in the caulking step and the gap adjusting step, it is possible to continuously perform caulking and gap adjusting by one pushing operation of the caulking tool. Thus, the manufacturing efficiency of the floating joint can be further improved, the control and maintenance of the manufacturing apparatus can be simplified, and the manufacturing cost can be reduced.

Alternatively, in the caulking step, the case may be caulked by pressing with a caulking tool, and in the gap adjusting step, the gap may be adjusted by pressing with a gap adjusting tool including a flat surface facing the stopper member.

As described above, even if the caulking tool is used in the caulking step and the gap adjusting tool is used in the gap adjusting step, the floating joint can be favorably manufactured. Particularly, by separately using the dedicated caulking tool and the gap adjusting tool individually, adjustment of caulking and gap can be performed with higher accuracy.

In this configuration, it is preferable that the case includes a peripheral wall surrounding the first connecting portion side protrusion, the second connecting portion side protrusion, the holding member, and the stopper member, and in the caulking step, an inner wall portion at an end portion of the peripheral wall is cut and caulked by pressing with the caulking tool.

In this way, in the caulking process, the inner wall portion of the end portion of the peripheral wall is cut and caulked by the pressing of the caulking tool, it is easy to plastically deform the inner wall portion easily to the inside and press the stopper member.

In this configuration, it is preferable that the caulking tool is formed in a cylindrical shape, and an outer edge portion of a facing surface of the caulking tool that faces the end portion of the case projects in a direction toward the case more than an inner edge portion of the facing surface.

Thus, since the projected outer edge portion of the caulking tool can easily cut the end portion of the case, the caulking step can be performed in a shorter time and with higher accuracy.

In order to achieve the above object, the present invention includes a floating joint in which a first connecting portion provided at one end of a case and a second connecting portion provided at another end of the case are swingable relatively to each other, the floating joint manufactured by performing a housing step of housing in the case a first connecting portion side protrusion protruding radially outward at an end portion of the first connecting portion, a second connecting portion side protrusion protruding radially outward at an end portion of the second connecting portion, a holding member disposed on one surface of the second connecting portion side protrusion and configured to hold the second connecting portion swingably, and a stopper member disposed at a predetermined temporarily stopped position set on an opposite side of the holding member with respect to the second connecting portion side protrusion; a caulking step of caulking an end portion of the case inward to cover the stopper member; and a gap adjusting step of adjusting a gap between the holding member and the stopper member by pressing the stopper member from the temporarily stopped position toward the holding member.

According to the above, the floating joint is manufactured by the caulking step and the gap adjusting step, so that the stopper member is reliably caulked and the gap between the holding member and the stopper member is accurately adjusted. Therefore, it is possible to smoothly swing the first connecting portion and the second connecting portion.

In this configuration, it is adequate that the first connecting portion includes a rod protruding from one end of the case, and a seat member which is configured in the case as a separate member from the rod and is in contact with the second connecting portion side protrusion.

In this way, by configuring the first connecting portion by the rod and the seat member, it is possible to move the rod and the seat member relative to each other so that the axial center of the rod and the axial center of the second connecting portion can be eccentric. As a result, the floating joint can favorably absorb misalignment between the driving source and the driven body.

Further, it is preferable that a concave portion is formed on a contact portion between the first connecting portion and the second connecting portion side protrusion and/or a contact portion between the second connecting portion side protrusion and the holding member, and that the concave portion is configured to retain a lubricant.

As described above, the floating joint is provided with the concave portion for retaining the lubricant, so that it is possible to realize a smooth swing by suppressing the decrease of the lubricant at each contact portion.

According to the method of manufacturing the floating joint and the floating joint manufactures by the method of the present invention, it is possible to efficiently assemble a plurality of members so as to have a predetermined gap, and to prevent falling off of the members.

BRIEF DESCRIPTION OF DRAWINGS

FIG. 1 is a side sectional view showing the overall configuration of a floating joint according to a first embodiment of the present invention;

FIG. 6A is a first explanatory diagram showing a method of manufacturing a floating joint according to the first embodiment;

FIG. 6B is a second explanatory diagram showing the manufacturing method following FIG. 6A;

FIG. 6C is a third explanatory diagram showing the manufacturing method following FIG. 6B;

FIG. 8A is a first explanatory diagram showing a method of manufacturing a floating joint according to the second embodiment;

FIG. 8B is a second explanatory diagram showing the manufacturing method following FIG. 8A;

FIG. 8C is a third explanatory diagram showing the manufacturing method following FIG. 8B;

FIG. 9A is a fourth explanatory diagram showing the manufacturing method following FIG. 8C;

FIG. 9B is a fifth explanatory diagram showing the manufacturing method following FIG. 9A;

FIG. 9C is a sixth explanatory diagram showing the manufacturing method following FIG. 9B;

FIG. 10A is a first explanatory diagram showing a method of manufacturing a floating joint according to a third embodiment;

FIG. 10B is a second explanatory diagram showing the manufacturing method following FIG. 10A;

FIG. 10C is a third explanatory diagram showing the manufacturing method following FIG. 10B;

FIG. 11A is a fourth explanatory diagram showing the manufacturing method following FIG. 10C;

FIG. 11B is a fifth explanatory diagram showing the manufacturing method following FIG. 11A; and FIG. 11C is a sixth explanatory diagram showing the manufacturing method following FIG. 11B.

DESCRIPTION OF EMBODIMENTS

Figure 2B:
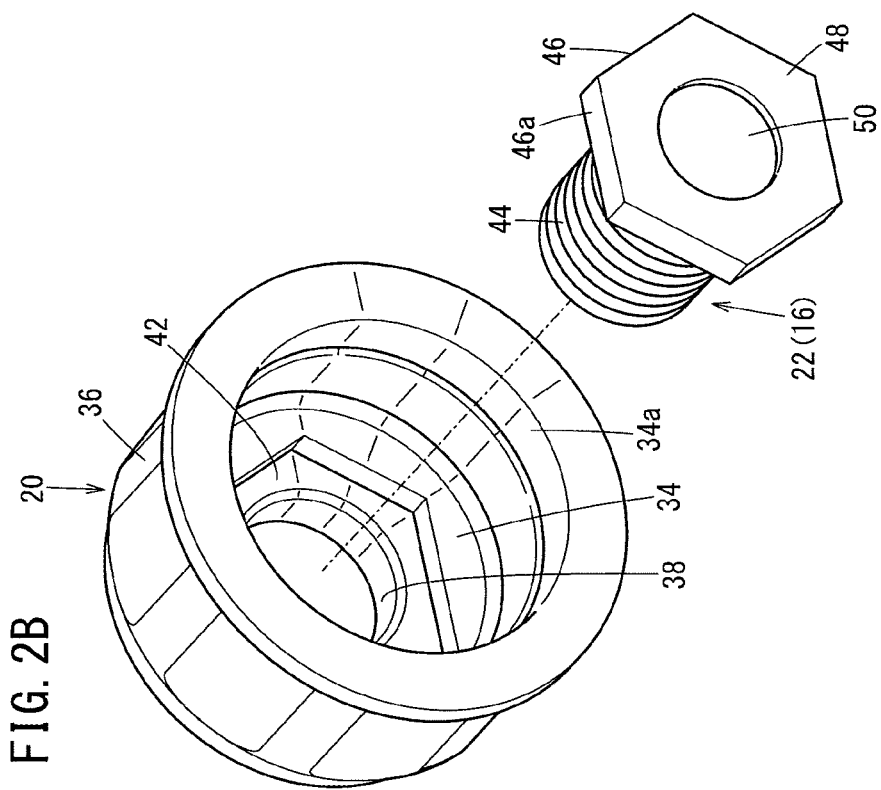
FIG. 2B is a perspective view showing assembling of a case and a stud of the floating joint of FIG. 1.

Preferred embodiments of a floating joint according to the present invention in relation to a manufacturing method thereof will be described in detail with reference to the accompanying drawings.

As shown in FIG. 1, a floating joint 10 (hereinafter also simply referred to as a joint 10) is attached to an actuator such as a cylinder 12 and transmits the driving force of the cylinder 12 to a workpiece W which is a driven body. Specifically, one end portion of the joint 10 is connected to a tip attachment portion 14a of a drive shaft 14 of the cylinder 12, and another end portion on the opposite side is connected to the workpiece W. Instead of being directly attached to the workpiece W, the joint 10 may be connected to a mounting structure (not shown) on which the workpiece W is mounted to transmit the driving force to the workpiece W.

The cylinder 12 to which the joint 10 is attached includes, for example, a fluid cylinder such as an air cylinder, a hydraulic cylinder, a hydraulic cylinder or the like, and an electric cylinder or the like. Of course, the actuator is not limited to the cylinder 12, and other linear drive type drive sources (including those in which rotational drive is converted to linear drive) may be used.

The joint 10 has a function of absorbing mutual misalignment or insufficient accuracy of parallelism between the cylinder 12 and the workpiece W. Specifically, the joint 10 includes a first connecting portion 16 connected to the workpiece W and a second connecting portion 10 connected to the cylinder 12. When there is a deviation between the cylinder 12 and the workpiece W, the first connecting portion 16 and the second connecting portion 18 are inclined relative to each other or relatively radially eccentric to absorb the deviation. In the following, in order to facilitate the understanding of the manufacturing method of the joint 10, configuration of each part of the joint 10 will be described in detail.

The joint 10 according to the present embodiment includes a case 20, a stud 22 (a rod), a disk 24 (a seat member), a socket 26, a ring 28 (a holding member), a plate (a stopper member), and a dust cover 32.

The case 20 is a housing having a housing space 34 for housing a plurality of members. The case 20 is formed in a cylindrical shape relatively large in the radial direction and relatively short in the axial direction. Further, the case 20 has a peripheral wall 36 extending in parallel along the axis of the case 20, and an end wall 38 connected to the tip of the peripheral wall 36 and slightly extending radially inward.

The outer peripheral surface of the peripheral wall 36 is formed in a polygonal shape (for example, a hexagonal shape or an octagonal shape) in which the flat surface and the circular arc surface are alternately repeated in a front view so that the user can grasp the joint 10 and easily screw it in (see also 2A). A proximal end opening 34a communicating with the housing space 34 is provided at the proximal end of the peripheral wall 36. Each member of the joint 10 is housed in the housing space 34 from the proximal end opening 34a.

A recess 40 for fixing the plate 30 is formed on the inner peripheral surface of the peripheral wall 36 close to the proximal end opening 34a. The recess 40 is formed in a positioning stepped portion 40a as a temporarily stopped position for disposing the plate 30 before the caulking process at the time of manufacturing the joint 10 (see also FIG. 6A). Then, after caulking, a proximal inner side wall portion 20a of the caulked case 20 and the positioning stepped portion 40a cooperate to form the recess 40.

On the other hand, the end wall 38 forms a distal end opening 34b communicating with the housing space 34 by an extended end extending radially inward from the peripheral wall 36. A part (male screw portion 44) of the stud 22 penetrates the distal end opening 34b. An engaging hole 42 for disposing a flange portion 46 of the stud 22 is formed on the bottom surface of the end wall 38 where the housing space 34 faces. As shown in FIG. 2B, this engaging hole 42 is formed in a polygonal shape (hexagonal shape in this embodiment) coinciding with the flange portion 46 when viewed from the proximal end side of the case 20.

The stud 22 is formed in a solid cylindrical shape and constitutes a part of the above-described first connecting portion 16. The stud 22 projects a predetermined length from the end wall 38 of the case 20 in an assembled state of the joint 10 and is connected and fixed to the workpiece W. Further, in the assembled state, the axis of the stud 22 is set coaxially with the axis of the case 20 (joint 10). The stud 22 has a male screw portion 44 extending in the axial direction, and the flange portion 46 continuing to the proximal end side of the male screw portion 44 and projecting outward in the radial direction.

On the outer peripheral surface of the male screw portion 44 protruding from the case 20, threads are formed in a spiral shape. A portion where the screw thread is not formed on the proximal end side of the male screw portion 44 is formed to have an outer diameter matching the inner diameter of the distal end opening 34b and tightly closes the distal end side of the housing space 34 without a gap.

The flange portion 46 is a portion (first connecting portion side protruding portion) disposed in the housing space 34 in order to prevent the stud 22 from being detached from the distal end opening 34b of the case 20. An outer edge portion 46a of the flange portion 46 is formed in a polygonal shape (hexagonal shape) when viewed from the proximal end direction (see also FIG. 2B). The joint 10 regulates the relative rotation of the case 20 and the stud 22 by the shapes of the engaging hole 42 and the flange portion 46. The shapes of the engaging hole 42 and the flange portion 46 are not particularly limited, and various shapes can be adopted to prevent separation of the stud 22 from the case 20 and make the stud 22 and the case 20 non-rotatable relative to each other.

Further, the proximal end surface of the flange portion 46 is a stud-side proximal end surface 48 with which the disk 24 contacts in the assembled state of the joint 10. At the center portion of the stud-side proximal end surface 48 and its peripheral portion, a recessed portion 50 (hollow portion) shallowly cut away in the distal direction of the stud 22 is provided. The recessed portion 50 is formed into a round shape, and by retaining the lubricant, the relative movement between the stud 22 and the disk 24 is made smooth. On the other hand, the stud-side proximal end surface 48 surrounding the engaging hole 42 is formed in a smooth flat shape.

Returning to FIG. 1, the disk 24 disposed on the proximal end side of the stud 22 constitutes the first connecting portion 16 together with the stud 22, and is a seat that can swingably receive the socket 26. The disk 24 is formed in a disk shape having a sufficient thickness (for example, approximately equal to that of the flange portion 46) and an outer diameter slightly smaller than the flange portion 46. The disk-side distal end surface 52 facing the stud 22 is formed in a smooth flat shape and contacts the stud-side proximal end surface 48 while covering the whole of the recessed portion 50 in the assembled state.

A disk-side proximal end surface 54 constituting the proximal end side of the disk 24 has a main surface 54a parallel to the surface direction of the disk-side distal end surface 52 at the central portion and its peripheral portion, and a peripheral surface 54b continuous to the outside of the main surface 54a and having a circular arc cross sectional shape. In the cross-sectional view, the formation range of the peripheral surface 54b is smaller than the main surface 54a, but this peripheral surface 54b is a portion directly in surface contact with the socket 26. The peripheral surface 54b is set in a circular arc shape having a relatively large radius of curvature in cross section.

On the other hand, the socket 26 is formed in a hollow cylindrical shape, and constitutes the aforementioned second connecting portion 18 connected and fixed to the cylinder 12 in the assembled state of the joint 10. A through hole 56 is provided inside the socket 26 along the axial center of the socket 26, and a proximal end opening 56a and a distal end opening 56b of the socket 26 communicate with both end portions of the through hole 56. The socket 26 has a female screw portion 58 extending a predetermined length in the proximal direction, and an umbrella portion 60 (a second connecting portion side protrusion) continuing to the distal end side of the female screw portion 58 and projecting radially outward and inward.

The female screw portion 58 is formed into a cylindrical shape having an outer diameter somewhat larger than the outer diameter of the male screw portion 44 (see also FIG. 2A), and a spiral thread is formed on the inner circumferential surface constituting the through hole 56. The female screw portion 58 according to the present embodiment is set so as to have threads of the same standard as the male screw portion 44, and screws the tip attachment portion 14a of the drive shaft 14 of the cylinder 12. Thus, the joint 10 is connected to the drive shaft 14.

Figure 2A:
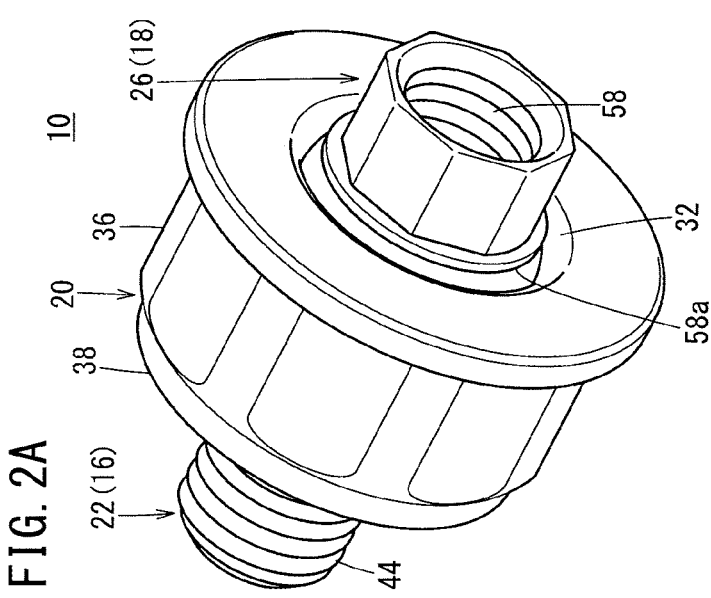
FIG. 2A is a perspective view of the floating joint of FIG. 1.

In order to facilitate attachment to the drive shaft 14, the outer peripheral surface of the female screw portion 58 is formed into a polygonal shape (octagonal shape in the present embodiment) as viewed from the proximal end side of the socket 26 (see FIG. 2A). Further, in an intermediate position of the outer peripheral surface of the female screw portion 58, a mounting groove portion 50a for attaching the dust cover 32 is provided along the circumferential direction.

Returning to FIG. 1, the umbrella portion 60 of the socket 26 is formed in a shape capable of tilting the first connecting portion 16 and the second connecting portion 18 relatively, in a state of contact with the disk 24.

Specifically, the umbrella portion 60 has a bowl shape in which a radially outer portion and a radially inner portion are connected, and covers the peripheral surface 54b of the disk 24. The radially inward projecting portion of the umbrella portion 60 constitutes the distal end opening 56b of the through hole 56. The distal end opening 56b causes the disk-side proximal end surface 54 to face the proximal direction in the assembled state of the joint 10.

Figure 3:
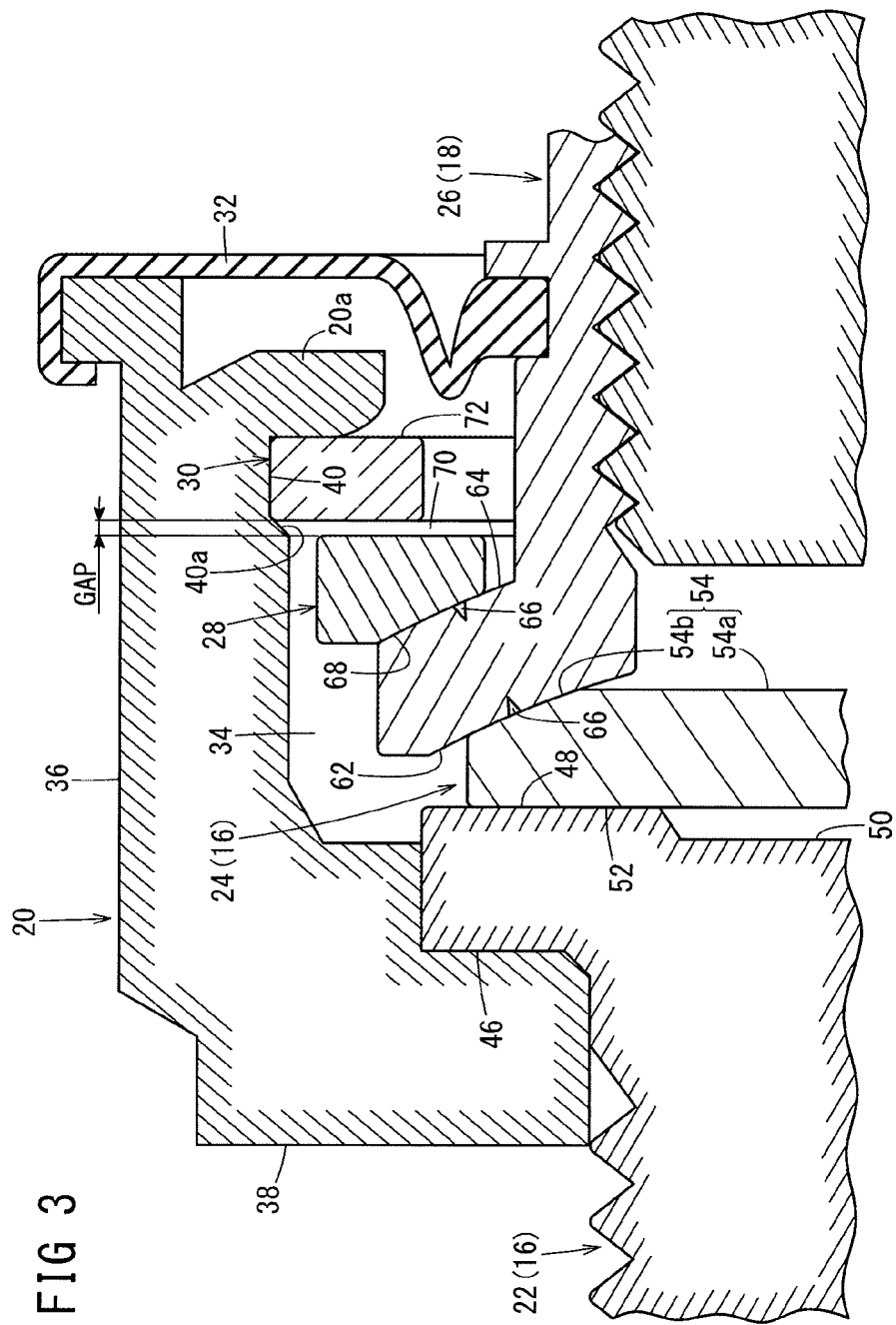
FIG. 3 is an enlarged side sectional view of a part of the floating joint of FIG. 1.

The umbrella portion 60 is formed to be thicker than the wall portion of the female screw portion 58, and the inner surface (an umbrella-side distal end surface 62) depicting the circular arc comes in surface contact with the peripheral surface 54b of the disk 24. That is, as shown in FIG. 3, the umbrella-side distal end surface 62 has the same curvature radius as the peripheral surface 54b. A lubricant such as grease or the like is applied to contact portions between the umbrella-side distal end surface 62 and the peripheral surface 54b. As a result, the socket 26 slides smoothly with respect to the disk 24.

Further, an umbrella-side proximal end surface 64 located on the opposite surface of the umbrella-side distal end surface 62 in the radially outwardly projecting portion of the umbrella portion 60 is also formed in a circular arc shape in cross section. The umbrella-side proximal end surface 64 is set to a radius of curvature parallel to the curved surface of the umbrella-side distal end surface 62, and is in surface contact with the ring 28.

Further, as shown in FIG. 3, minute cutout portions 66 (concave portions) are formed at predetermined positions of the umbrella-side distal end surface 62 and the umbrella-side proximal end surface 64, respectively. The cutout portion 66 has a function of retaining lubricant, and improves slidability and abrasion resistance between the socket 26 and the disk 24 or between the socket 26 and the ring 28. Note that the cutout portion 66 may be formed in an annular groove along the circumferential direction of the umbrella portion 60 or may be discretely formed in a spread manner like islands.

Figure 4:
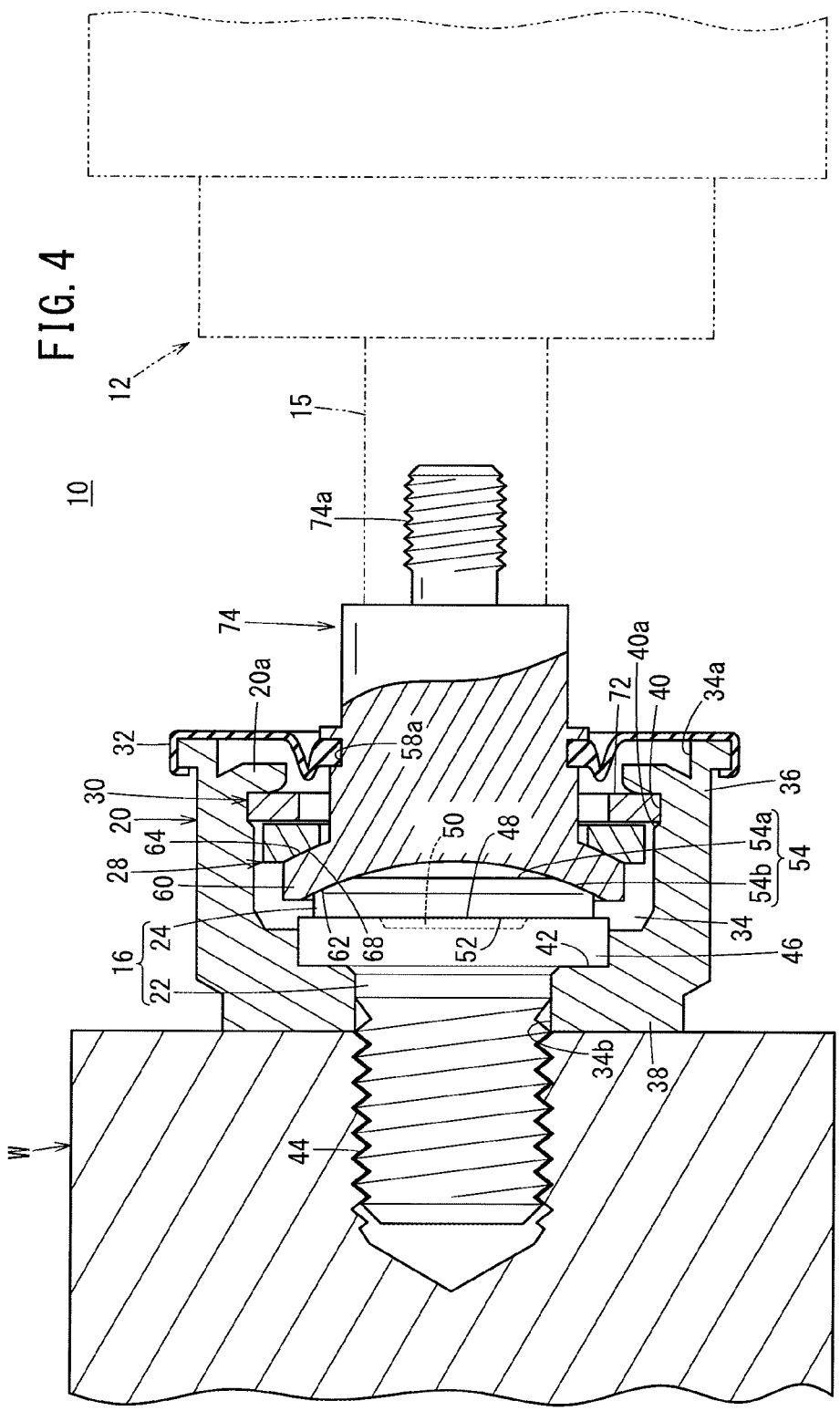
FIG. 4 is a side sectional view showing the entire configuration of a floating joint according to another modification of the present invention.

It should be noted that the second connecting portion 18 is not limited to the socket 26 screwed to the outer peripheral surface of the drive shaft 14 of the cylinder 12, and various configurations are applicable. For example, as shown in FIG. 4, the second connection portion 18 may be a block 74 formed in a solid shape and having a male screw 74a protruding in the proximal direction. The block 74 also has the umbrella portion 60, the umbrella-side distal end surface 62, and the umbrella-side proximal end surface 64, so that the same operation as the socket 26 can be performed. Further, the male screw 74a is screwed into a drive shaft 15 having the female screw hole, thereby being firmly connected to the cylinder 12.

The ring 28 disposed on the umbrella-side distal end surface 62 makes surface contact with the umbrella portion 60 of the socket 26 in the assembled state of the joint 10, thereby realizing smooth swinging of the socket 26. The ring 28 has an inner diameter larger than the outer diameter of the female screw portion 58 of the socket 26 and an outer diameter smaller than the inner diameter of the peripheral wall 36 of the case 20 and has a sufficient thickness (about the same as the disk 24).

The distal end and the inner side of the ring 28 are formed on a ring-side curved surface 68 (one surface of the pressing member) depicting a circular arc cross section. The ring-side curved surface 68 is set to be equal to the radius of curvature of the umbrella-side proximal end surface 64, thereby stably holding the socket 26 while guiding the relative rocking with the socket 26.

Further, on the proximal end side of the ring 28, the plate 30 is disposed with a minute gap 70 therebetween. The gap 70 is set so that the plate 30 does not strongly press the disk 24 and the socket 26 and the ring 28, thereby suppressing rattling of the joint 10. The gap 70 is appropriately adjusted by positioning the plate 30 during manufacture. The adjustment of the gap 70 will be described in detail in the description of the manufacturing method.

The plate 30 is a ring body that prevents each member from falling off from the proximal end opening 34a of the case 20. The outer diameter of the plate 30 is set to a dimension approximately matching the inner diameter of the recess 40 of the case 20. On the other hand, the inner diameter of the plate 30 is set to be somewhat larger than the inner diameter of the ring 28.

In the state where the plate 30 is placed on the positioning stepped portion 40a of the case 20, the proximal end surface (a plate-side proximal end surface 72) of the plate 30 is pressed by caulking the peripheral wall 36 on the proximal end side of the case 20. As a result, the plate 30 is fixed in the recess 40 of the case 20, and prevents each member housed on the distal end side from coming off.

Further, the dust cover 32 of the joint 10 is provided to close the proximal end opening 34a of the case 20. The dust cover 32 is fixed to the proximal end of the peripheral wall 36 of the case 20 and is fixed to the mounting groove portion 58a of the socket 26. Further, by providing the dust cover 32 with a certain degree of wrinkle, the wrinkle portion spreads even when the socket 26 is inclined or eccentric, and the rupture does not occur.

The joint 10 according to the present embodiment is basically configured as described above. The operation at the time of using this joint 10 will be described below.

As shown in FIG. 1, the joint 10 connects the cylinder 12 and the workpiece W at the time of use. In accordance with advancement of the drive shaft 14, the joint 10 presses the disk 24 by the socket 26, and the pressing force is transmitted to the workpiece W through the disk 24 and the stud 22 to advance the workpiece W. On the other hand, when the drive shaft 14 retreats, the umbrella portion 60 of the socket 26 is caught by the ring 28 and retracts in the proximal direction. As a result, the plate 30, the case 20, the disk 24, and the stud 22 are integrally displaced, and the workpiece W also follows and retracts in the proximal direction.

Further, when misalignment or insufficient accuracy of parallelism occurs between the cylinder 12 and the workpiece W, the joint 10 performs "tilting motion" or "eccentric motion". The tilting motion is an action of tilting the axis O1 of the first connecting portion 16 with respect to the axis O2 of the second connecting portion 18. The eccentric motion is an action of shifting the axial center O2 of the second connecting portion 18 and the axial center O1 of the first connecting portion 16.

Figure 5A:
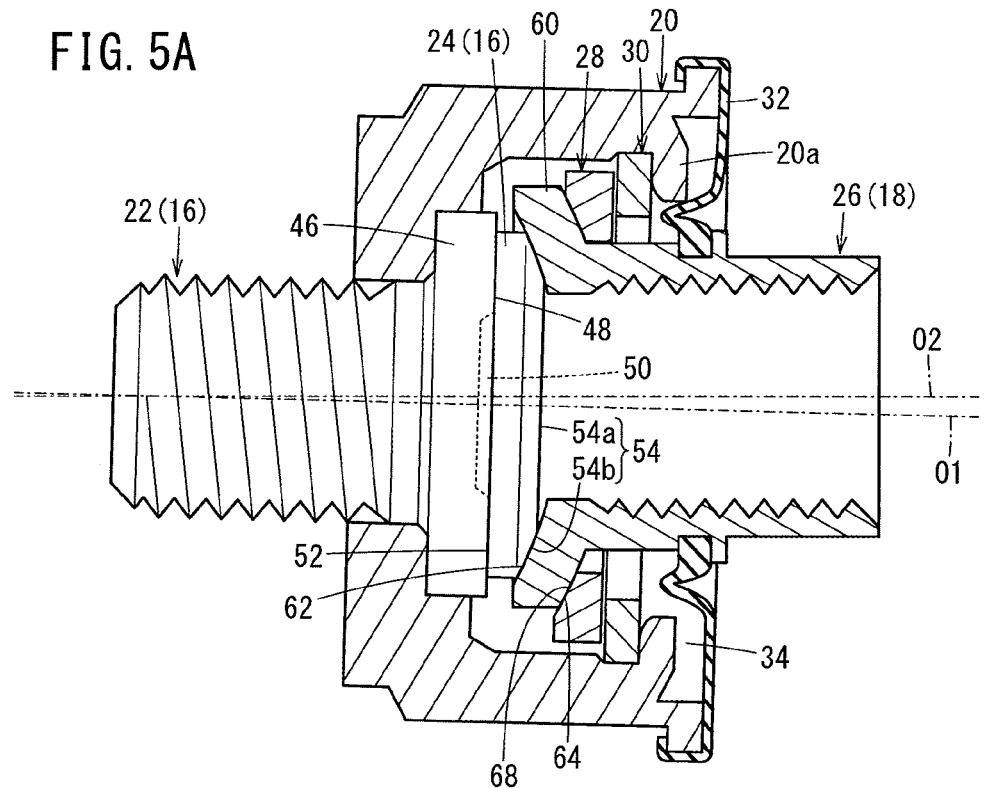
FIG. 5A is a side sectional view showing a tilting operation of the floating joint of FIG. 1.

For example, in the tilting operation shown in FIG. 5A, the other member of the joint 10 is inclined with respect to the socket 26 fixed to the drive shaft 14. Specifically, the disk 24 and the ring 28 slide along the curved surface (the umbrella-side distal end surface 62 and the umbrella-side proximal end surface 64) of the umbrella portion 60 of the socket 26, respectively, and whereby the case 20, the stud 22, the plate 30, and the dust cover 32 also tilt integrally.

At this time, the lubricant applied to the contact portion of each member assists the sliding of the disk 24 and the ring 28 with respect to the umbrella portion 60. In addition, the cutout portion 66 of the socket 26 retains the lubricant of each contact portion and realizes smooth swinging. As a result, the disk-side proximal end surface 54 is smoothly displaced along the umbrella-side distal end surface 62 in surface contact, and the ring-side curved surface 68 also smoothly moves along the umbrella-side proximal end surface 64 in surface contact.

That is, the axial center O1 of the stud 22 is inclined by a slight angle with respect to the axial center O2 of the socket 26 in accordance with the misalignment of the drive shaft 14 of the cylinder 12 and the workpiece W, and transmits the driving force of the drive shaft 14. The angle of the inclination of the stud 22 is, for example, within a range of 5° from the axis O2 of the socket 26. Although the contact positions of the socket 26, the disk 24 and the ring 28 are changed by the tilting motion, the surface contact on the curved surface is favorably continued. As a result, the joint 10 absorbs misalignment and displaces the workpiece W satisfactorily.

Figure 5B:
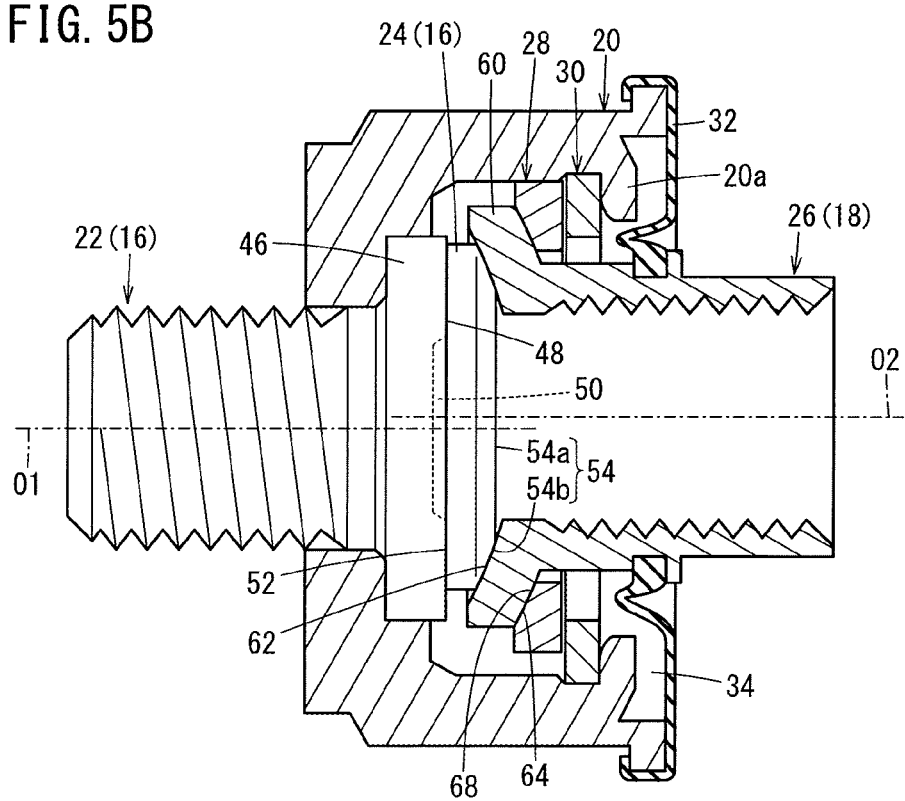
FIG. 5B is a side sectional view showing an eccentric operation of the floating joint of FIG. 1.

For example, the joint 10 displaces the stud 22 in a direction orthogonal to the axial center O2 of the socket (the radial direction of the joint 10) in the eccentric motion shown in FIG. 5B. Specifically, the umbrella portion 60 of the socket 26 presses the disk 24 and the stud 22 slides in the surface direction of the disk 24, and whereby the stud 22 and the case 20 are decentered. In other words, by configuration of the first connecting portion 16 including the stud 22 and the disk 24, the stud 22 is relatively moved with respect to the disk 24, so that the axis O1 of the stud 22 and the axis O2 of the socket 26 are decentered.

It is preferable that a lubricant is also applied to the joint 10 between the disk 24 and the stud 22. As a result, relative movement between the disk 24 and the stud 22 is smoothed. Furthermore, the recessed portion 50 of the stud 22 can reduce the frictional resistance with the disk 24 by retaining the lubricant, and can facilitate relative movement between the stud 22 and the disk 24.

In this manner, the joint 10 eccentrically disposes the axis O1 of the stud 22 and the axis O2 of the socket 26 according to the misalignment of the drive shaft 14 of the cylinder 12 and the workpiece W, and transmits the driving force of the drive shaft 14. Although the contact positions of the disk 24 and the stud 22 are changed due to the eccentric operation, the flat surfaces of the disks 24 and the stud 22 are kept in good contact with each other and the misalignment of the cylinder 12 and the workpiece W can be well absorbed.

Next, a manufacturing method of the joint 10 configured as described above will be described with reference to FIGS. 6A to 11C.

First Embodiment

In the manufacture of the joint 10 according to the first embodiment, after individual members (the case 20, the stud 22, the disk 24, the socket 26, the ring 28 and the plate 30) are separately formed, assembling of the members is performed by a manufacturing apparatus 80 for joint assembly. Specifically, caulking is performed on the joint 10 before assembling in which each member is housed, and a gap adjustment between the ring 28 and the plate 30 is performed.

Therefore, as shown in FIG. 6A, the manufacturing apparatus 80 includes a base 82 on which the case 20 is disposed, and a punch 84 (caulking tool) that advances toward and retracts from the base 82 at a position facing the base 82. Further, the manufacturing apparatus 80 has a control unit (not shown) for managing and controlling the manufacture of the joint 10. This control unit appropriately controls the movement amount and movement time of the punch 84 at the time of assembling.

The base 82 is made of, for example, a hard metal material and has a placement surface 82a on which the end wall 38 of the case 20 of the joint 10 is placed. An insertion hole 86 for inserting the stud 22 of the joint 10 is provided at a predetermined position of the placement surface 82a. The placement surface 82a around the insertion hole 86 is formed in a flat surface conforming to the shape of the distal end of the case 20, and the case 20 can be positioned and fixed by an appropriate positioning means (not shown).

The punch 84 is formed into a cylindrical body by, for example, a hard metal material. The punch 84 has a cylindrical wall 90 made of relatively thick meat, and a hollow portion 88 is provided in the axial center. The upper end of the punch 84 is attached to a drive mechanism (cylinder or the like) (not shown). In this mounting state, the axis center of the punch 84 is located at a position coincident with the axial center of the insertion hole 86 of the base 82, and the punch 84 advances and retreats along the axial center by the driving mechanism.

The outer diameter of the cylindrical wall 90 of the punch 84 is set somewhat larger than the inner diameter of the housing space 34 of the case 20 and the inner diameter thereof is set somewhat larger than the outer diameter of the female screw portion 58 of the socket 26. Part of the distal end portion (the lower end portion in FIG. 6A) of the cylindrical wall 90 that extends from the center in the thickness direction toward the inner side (the hollow portion 88) in the radial direction (inner half of the distal end portion) is a flat pressing surface 90a. On the other hand, a projecting portion 90b projecting in the distal direction from the pressing surface 90a is formed in a portion of the cylindrical wall 90 that is connected to the pressing surface 90a and extends from the connecting portion toward the outer circumferential surface of the cylindrical wall 90.

The projecting portion 90b is formed in a triangular shape with the outer peripheral surface side most protruding in side sectional view, and the apex of the tip side is an acute angle. The apex of the projecting portion 90b is disposed at a position facing the proximal end of the case 20 in the attachment state of the punch 84.

At the time of manufacturing the joint 10, the case 20 is positioned and fixed on the placement surface 82a of the base 82, and a housing step of housing each member in the housing space 34 of the case 20 is performed. In this case, the stud 22, the disk 24, the socket 26, the ring 28 and the plate 30 are sequentially housed in the housing space 34 from the proximal end opening 34a of the case 20.

In the housed state of each member, the disk 24 is placed on the stud-side proximal end surface 48, the socket 26 is placed on the disk-side proximal end surface 54, and the ring 28 is placed on the umbrella-side proximal end surface 64.

On the other hand, the outer peripheral portion of the plate 30 is placed on the positioning stepped portion 40a of the case 20, and is separated from the ring 28 by a relatively large gap 70a.

After the housing process, as shown in FIG. 6B, the manufacturing apparatus 80 advances the punch 84 toward the case 20, and performs a caulking process for caulking each member with respect to the case 20. Specifically, at the initial stage when the punch 84 contacts the case 20, the projecting portion 90b is first brought into contact with a predetermined position on the proximal end of the case 20 (in the vicinity of the central portion in the thickness direction of the case 20).

In this state, when the punch 84 advances toward the case 20, as shown in FIG. 6C, the proximal end of the case 20 is cut by the projecting portion 90b. The proximal inner side wall portion 20a of the cut case 20 is tilted inward in the radial direction according to the inclination of the projecting portion 90b and then falls down in the plane direction of the pressing surface 90a. As a result, the plate 30 is caulked by the proximal inner side wall portion 20a of the case 20. Each member in the case 20 is prevented from falling out of the proximal end opening 34a of the case 20 by this caulking process.

Figure 7A:
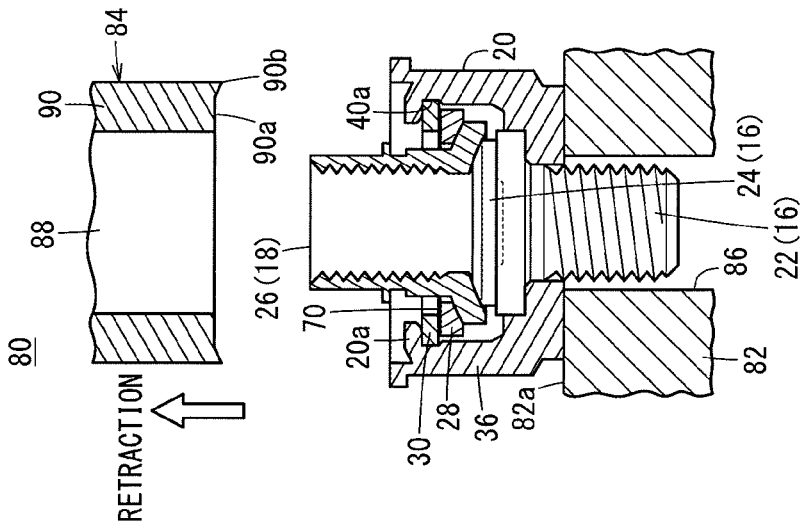
FIG. 7A is a fourth explanatory diagram showing the manufacturing method following FIG. 6C.

Next, in the manufacturing apparatus 80, by further advancing the punch 84, a gap adjusting step is performed to shorten the gap 70 between the ring 28 and the plate 30 as shown in FIG. 7A. In this case, the control unit of the manufacturing apparatus 80 pushes the punch 84 toward a lower end by a predetermined amount, thereby pushing the proximal inner side wall portion 20a (that is, the recess 40) and the plate 30 together in a downward direction. As a result of this pressing, the positioning stepped portion 40a of the case 20 is plastically deformed so as to be crushed downward. Therefore, the gap 70 narrower than the gap 70a during the caulking process is formed.

The gap 70 after the clearance adjusting step is a distance such that the ring 28 and the plate 30 are slightly separated from each other (see also FIG. 3). Thereby, it is suppressed that the members are brought into tight contact with each other. In addition, the caulking step and the gap adjustment step act to maintain the proximal inner side wall portion 20a in the plastically deformed position (caulked state).

Figure 7B:
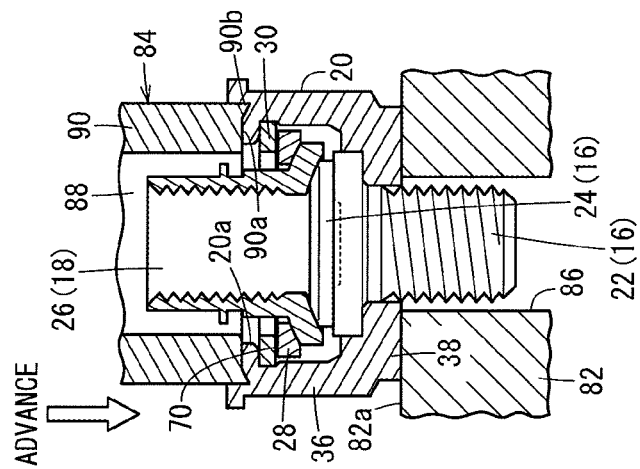
FIG. 7B is a fifth explanatory diagram showing the manufacturing method following FIG. 7A.

When the gap adjusting step is completed, the manufacturing apparatus 80 causes the punch 84 to retract (raise) relative to the joint 10 as shown in FIG. 7B. Then, the assembled joint 10 is taken out from the manufacturing apparatus 80 (or in a state as it is), and the dust cover 32 is fixed to the proximal end portion of the case 20. This completes the manufacture of the joint 10. The manufacturing apparatus 80 continuously manufactures a plurality of joints 10 by repeating the above-described steps.

As described above, according to the manufacturing method of the joint 10 according to the present embodiment, the joint 10 is manufactured by surely caulking the plate 30 and precisely adjusting the gap 70 between the ring 28 and the plate 30. That is, in the caulking process, the proximal inner side wall portion 20a of the case 20 is caulked inward so as to cover the plate 30, so that the plate 30 is well prevented from coming off, and that each member housed on the back side of the case 20 with respect to the plate 30 is prevented from falling off. In addition, in the gap adjusting step, by pressing the plate 30 to adjust the gap 70 from the ring 28, it is possible to prevent the plate 30 from strongly pressing each member, so that the tilting motion and the eccentric motion of the socket 26 can be smoothly performed.

In addition, by using the same punch 84 in the caulking process and the gap adjusting process, it is possible to continuously perform the caulking and the adjustment of the gap 70 by one pushing operation of the punch 84. This further improves the manufacturing efficiency of the joint 10, simplifies the control and maintenance of the manufacturing apparatus 80, and reduces the manufacturing cost.

Further, in the caulking process, the proximal inner side wall portion 20a of the peripheral wall 36 of the case 20 is cut and caulked by pressing with the punch 84, the proximal inner side wall portion 20a is easily plastically deformed inwardly to press the plate 30. At this time, since the projecting portion 90b of the punch 84 can easily cut the proximal end of the case 20, the caulking process can be performed in a shorter time and with high accuracy.

The method of manufacturing the joint 10 according to the present invention and the joint 10 manufactured by the method are not limited to the above embodiments, and various modifications and application examples can be adopted. For example, the first connecting portion 16 may be formed not only by the two members of the stud 22 and the disk 24 but also by a member integrally molded. In this case, although the eccentric motion is restricted in the joint 10, it is possible to make the tilting motion even more smooth.

Several methods for manufacturing the other joint 10 will be exemplified below. In the following description, the same reference numerals are given to components having the same configuration or the same functions as those of the first embodiment, and a detailed description thereof will be omitted.

Second Embodiment

A method of manufacturing the joint 10 according to the second embodiment, as shown in FIGS. 8A to 9C, is different from the manufacturing method according to the first embodiment in that the tool used by a manufacturing apparatus 100 is changed in the caulking process and the clearance adjusting process, respectively. That is, as shown in FIG. 8A, the manufacturing apparatus 100 includes a caulking punch 102 (a caulking tool) used for a caulking process and an adjusting punch 104 (a gap adjusting tool) as shown in FIG. 9A. Then, the manufacturing apparatus 100 exchanges tools to face the case 20 (at a position corresponding to the axial center of the insertion hole 86) for each process.

The distal end of a cylindrical wall 103 of the caulking punch 102 is formed into a tapered surface 103a that protrudes toward the lower end from the inner circumferential surface toward the outer circumferential surface. The inner diameter and the outer diameter of the cylindrical wall 103 are set to the same dimensions as the inner diameter and the outer diameter of the punch 84 according to the first embodiment. On the other hand, the distal end of a cylindrical wall 105 of the adjusting punch 104 is formed as a flat surface 105a parallel to the placement surface 82a of the base 82. Further, the outer diameter of the cylindrical wall 105 is set to be slightly smaller than the outer diameter of the caulking punch 102. The caulking punch 102 and the adjusting punch 104 are preferably exchanged automatically by parallel movement, rotation or the like by a driving mechanism (not shown) of the manufacturing apparatus 100.

In the manufacturing method of the joint 10 according to the second embodiment, as shown in FIG. 8A, the case 20 is positioned and fixed on the placement surface 82a, and the housing step of housing each member in the housing space 34 of the case 20 is performed. At this time, it is advisable to arrange the caulking punch 102 at a position facing the case 20.

After the housing step, the caulking punch 102 is advanced toward the case 20 to bring the top of the tapered surface 103a into contact with the proximal end of the peripheral wall 36 of the case 20 to cut the inside of the peripheral wall 36 (see FIG. 8B), and a caulking process is performed to caulk it inward. After the contact, the tapered surface 103a at the tip of the cylindrical wall 103 tilts the proximal inner side wall portion 20a obliquely (see FIG. 8C) as the caulking punch 102 advances. Even in the state after this caulking process, the joint 10 can prevent the plate 30 from coming off by the proximal inner side wall portion 20a.

After the caulking process, the manufacturing apparatus 100 retracts the caulking punch 102 from the case 20, further moves the caulking punch 102 and the adjusting punch 104, and arranges the adjusting punch 104 at the position facing the case 20 (see FIG. 9A). Then, a clearance adjusting step is carried out.

In the gap adjusting step, the adjusting punch 104 is advanced toward the case 20, and the proximal inner side wall portion 20a which has been already caulked inward is pressed (see FIG. 9B). Here, the adjusting punch 104 linearly adds a pressing force in the lower end direction to the proximal inner side wall portion 20a by the flat surface 105a at the distal end, so as to smoothly push in the plate 30 downward together with the proximal inner side wall portion 20a. As a result, the positioning stepped portion 40a supporting the plate 30 is pushed down, and the gap 70 between the plate 30 and the ring 28 is set with high accuracy.

Upon completion of the gap adjusting process, the manufacturing apparatus 100 moves the adjusting punch 104 backward relative to the joint 10 (see FIG. 9C). In the joint 10, the proximal inner side wall portion 20a of the case 20 is plastically deformed and the proximal end surface of the plate 30 is pressed. Then, the dust cover 32 is fixed to the proximal end portion of the case 20, and whereby the joint 10 is manufactured.

As described above, also in the manufacturing method of the joint 10 according to the second embodiment, by using the caulking punch 102 in the caulking process and by using the adjusting punch 104 in the gap adjusting process, it is possible to manufacture the joint 10 satisfactorily. Particularly, by separately selecting the special caulking punch 102 and the adjusting punch 104 individually, adjustment of the caulking and the gap 70 can be performed with higher accuracy.

Third Embodiment

As shown in FIGS. 10A to 11C, the manufacturing method (manufacturing apparatus 100A) of the joint 10 according to the third embodiment is different from the manufacturing method according to the second embodiment in that the order of the caulking process and the gap adjusting process at the time of manufacturing is reversed. Meanwhile, the manufacturing apparatus 100A is the same as the manufacturing apparatus 100 according to the second embodiment in that the caulking punch 102 and the adjusting punch 104 are selectively used.

That is, the manufacturing apparatus 100A performs the gap adjusting process first, after the housing process shown in FIG. 10A. Therefore, the adjusting punch 104 is disposed to face the case 20 in which the respective members are housed in the housing space 34. A cylindrical wall 106 of the adjusting punch 104 is formed to have an outer diameter slightly smaller than the inner diameter of the peripheral wall 36 on the proximal end side of the case 20.

The manufacturing apparatus 100A advances the adjusting punch 104 in the lower end direction to bring a flat surface 106a of the adjusting punch 104 into contact with the plate 30 and press the plate 30 downward, as shown in FIG. 10B. Therefore, as shown in FIG. 10C, the positioning stepped portion 40a inside the case 20 is pushed in together with the plate 30, and the interval between the gap 70 between the ring 28 and the plate 30 is adjusted. In this case, since the pressing force of the adjusting punch 104 is easily transmitted to the plate 30 and the case 20, the gap 70 can be adjusted more accurately.

After the gap adjusting process, the adjusting punch 104 is retracted from the case 20, the adjusting punch 104 and the caulking punch 102 are further moved, and as shown in FIG. 11A, the caulking punch 102 is moved to the facing position to the case 20. Then, a caulking process is carried out.

In the caulking process, the caulking punch 102 is advanced toward the case 20, the proximal end of the peripheral wall 36 of the case 20 is cut, and the proximal inner side wall portion 20a is tilted inward by the tapered surface 103a. As a result, the proximal inner side wall portion 20a is plastically deformed obliquely to caulk the plate-side proximal end surface 72. Even if the proximal inner side wall portion 20a does not fall sideways, since the recess 40 is formed at the outer edge of the plate 30 to fix the plate 30, the disengagement of the plate 30 is securely prevented.

When the caulking process is completed, the manufacturing apparatus 100A retracts the caulking punch 102 relatively from the joint 10 as shown in FIG. 11C. Then, the joint 10 is manufactured by fixing the dust cover 32 to the proximal end portion of the case 20.

As described above, also in the manufacturing method of the joint 10 according to the third embodiment, the joint 10 can be efficiently and accurately manufactured by performing the gap adjusting process first and then performing the caulking process.

While the present invention has been described with reference to the preferred embodiments, it is to be understood that the present invention is not limited to the above-described embodiments and that various modifications can be made without departing from the gist of the present invention.

The invention claimed is:

1. A method of manufacturing a floating joint in which a first connecting portion provided at one end of a case and a second connecting portion provided at another end of the case are swingable relatively to each other, the method comprising:
    a housing step of housing in the case a first connecting portion side protrusion protruding radially outward at an end portion of the first connecting portion, a second connecting portion side protrusion protruding radially outward at an end portion of the second connecting portion, a holding member disposed on one surface of the second connecting portion side protrusion and configured to hold the second connecting portion swingably, and a stopper member disposed at a positioning stepped portion of the case provided on an opposite side of the holding member with respect to the second connecting portion side protrusion;
    a caulking step of caulking an end portion of the case inward to cover the stopper member; and a gap adjusting step of adjusting a gap between the holding member and the stopper member by pressing the stopper member toward the holding member, wherein in the caulking step, a recess is formed for fixing the stopper member with an inner side wall portion which is caused by caulking and the positioning stepped portion, and wherein in the gap adjusting, step, the recess which is comprised of the inner side wall portion and the positioning stepped portion, and the stopper member, are pressed together, thereby crushing the positioning stepped portion to form the gap.

2. The method of manufacturing the floating joint according to claim 1, wherein same caulking tool is used in the caulking step and the gap adjusting step.

3. The method of manufacturing the floating joint according to claim 2, wherein the case includes a peripheral wall surrounding the first connecting portion side protrusion, the second connecting portion side protrusion, the holding member, and the stopper member, and in the caulking step, an inner wall portion at an end portion of the peripheral wall is cut and caulked by pressing with the caulking tool.

4. The method of manufacturing the floating joint according to claim 3, wherein the caulking tool is formed in a cylindrical shape, and an outer edge portion of a facing surface of the caulking tool that faces the end portion of the case projects in a direction toward the case more than an inner edge portion of the facing surface.

5. The method of manufacturing the floating joint according to claim 1, wherein in the caulking step, the case is caulked by pressing with a caulking tool, and in the gap adjusting step, the gap is adjusted by pressing with a gap adjusting tool including a flat surface facing the stopper member.

6. A floating joint in which a first connecting portion provided at one end of a case and a second connecting portion provided at another end of the case are swingable relatively to each other, the floating joint manufactured by performing:

a housing step of housing in the case a first connecting portion side protrusion protruding radially outward at an end portion of the first connecting portion, a second connecting portion side protrusion protruding radially outward at an end portion of the second connecting portion, a holding member disposed on one surface of the second connecting portion side protrusion and configured to hold the second connecting portion swingably, and a stopper member disposed at a positioning stepped portion of the case provided on an opposite side of the holding member with respect to the second connecting portion side protrusion;

a caulking step of caulking an end portion of the case inward to cover the stopper member; and a gap adjusting step of adjusting a gap between the holding member and the stopper member by pressing the stopper member toward the holding member, wherein in the caulking step, a recess is formed for fixing the stopper member with an inner side wall portion which is caused by caulking and the positioning stepped portion, and wherein in the gap adjusting step, the recess which is comprised of the inner side wall portion and the positioning stepped portion, and the stopper member, are pressed together, thereby crushing the positioning stepped portion to form the gap.

7. The floating joint according to claim 6, wherein the first connecting portion includes a rod protruding from one end of the case, and a seat member which is configured in the case as a separate member from the rod and is in contact with the second connecting portion side protrusion.

8. The floating joint according to claim 6, wherein a concave portion is formed on a contact portion between the first connecting portion and the second connecting portion side protrusion and/or a contact portion between the second connecting portion side protrusion and the holding member, the concave portion configured to retain a lubricant.

* * * * *